No. 851,320. PATENTED APR. 23, 1907.
W. O. ROGERS.
POULTRY FEEDER.
APPLICATION FILED AUG. 3, 1906.
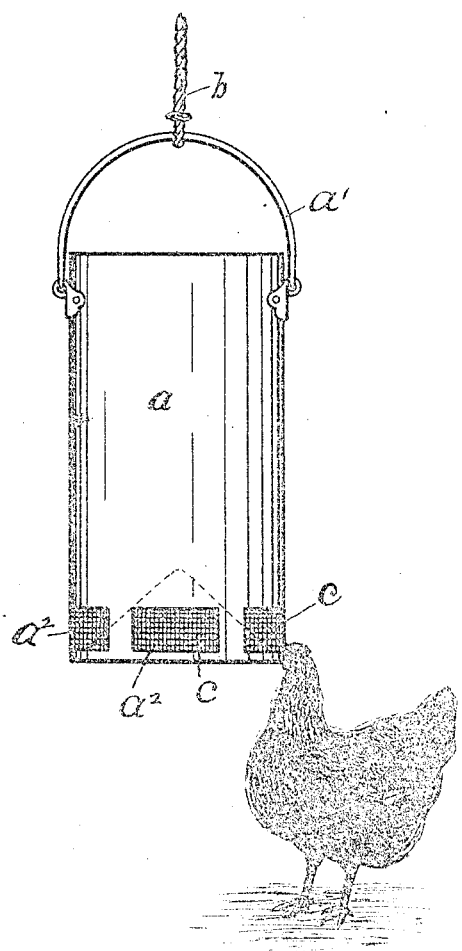
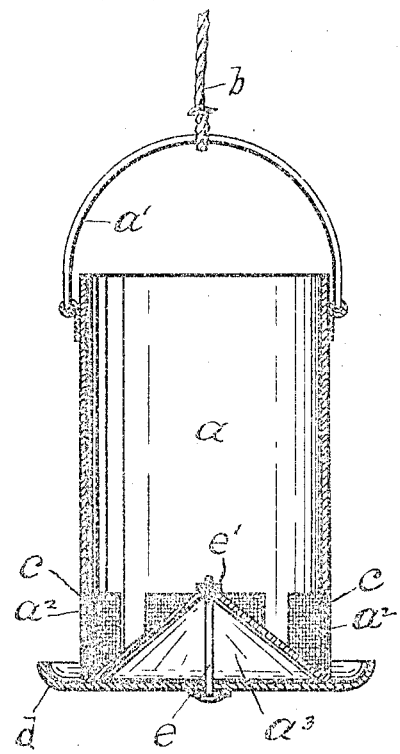
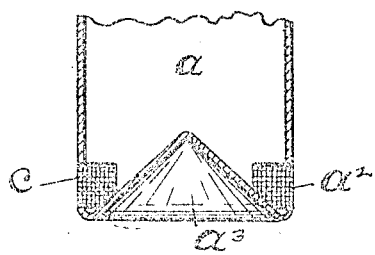
Woodbury O. Rogers, Inventor
Witnesses
Frank C. Palmer
Madeline D. Ritchie
by Frank H. Allen
Attorney

UNITED STATES PATENT OFFICE.

WOODBURY O. ROGERS, OF NORWICH, CONNECTICUT.

POULTRY-FEEDER.

No. 851,320.  Specification of Letters Patent.  Patented April 23, 1907.

Application filed August 3, 1906. Serial No. 328,983.

*To all whom it may concern:*

Be it known that I, WOODBURY O. ROGERS, a citizen of the United States, residing at Norwich, in the county of New London and State of Connecticut, have invented a certain new and useful Improvement in Poultry-Feeders, which improvement is fully set forth and described in the following specification, reference being also made to the accompanying drawings.

The chief object of this invention is to provide a simple and inexpensive feeding device for poultry, which device shall not only effect a saving of feed but will also compel the poultry to exercise to a large extent in dislodging the grain or other feed from said device, as I have explained more fully hereafter.

The drawings annexed hereto serve to aid in explaining my said invention, Figure 1 being an elevation of a poultry feeder embodying my present improvements in their simplest form. Fig. 2 shows a sectional elevation of a similar feeder that is more particularly adapted for feeding clover, chopped alfalfa and the like feed. Fig. 3 is a central, vertical, sectional view of the lower portion of the feeder, shown in Fig. 1.

Briefly described, my said invention consists of a receptacle that is suspended by a cord or wire so as to swing freely, the lower portions of the circumferential wall of said receptacle being provided with openings that are barred or covered with wire screen having meshes large enough to allow the feed to pass therethrough. The said receptacle is suspended at such height above the ground that the fowl must reach upward in order to peck the exposed feed and then dislodge it from behind the said screen. The feed then drops to the ground and is picked up and swallowed by the fowl who then lifts its head again to dislodge another portion of the feed.

Referring now to the annexed drawings, the letter $a$ indicates a receptacle here shown as a cylindrical pail, having a bail $a'$ by means of which said receptacle may be suspended from a cord or wire $b$; the bottom of said receptacle being located a few inches more or less above the ground according to the size of the fowls to be fed.

The lower portion of the circumferential wall of the receptacle $a$ is provided with openings $a^2$ that are partially barred, preferably by wire screen $c$ having meshes of sufficient size to allow the particles of grain or other food to pass therethrough, but small enough to restrict the free passage of said food.

The bottom $a^3$ of the receptacle is of cone shape and extends upward in the receptacle in such manner as to cause the food to gravitate toward the openings $a^2$ and against the inner face of the said screen.

Assuming now that we have a receptacle as described (and as shown in Figs. 1 and 3), and that said receptacle has been partially filled with corn or other grain; said receptacle is first adjusted so as to swing freely a few inches above the ground and the fowls are turned loose around it when (as I find by actual experience) said fowls immediately reach up and peck through the meshes of the screen $c$, thus dislodging one or two kernels which drop to the ground and the fowl then reaches down to pick it up and swallow it. These operations are repeated until the fowl is satisfied for the time. In practice the receptacle swings slightly from side to side as a result of the constant pecking of the fowls, so that the fowls are kept in constant exercise so long as they are feeding.

In the form of feeder shown in Fig. 2 the receptacle $a$ is identical in construction with the one already described in detail by me, but I have added thereto a feed-trough $d$ that is held in place at the bottom of the said receptacle by a bolt $e$ and nut $e'$ as seen in said Fig. 2; said trough being sometimes desirable when feeding chopped grass, clover, and the like. The finely chopped particles when dislodged from behind the screen, by the pecking of the fowl drop into the trough $d$ instead of on to the ground and are then picked from said trough by the fowl. By thus causing the finely chopped particles to be caught by the trough they are prevented from being trodden upon by the flock of fowls and wasted. When, however, corn or other grain is fed the kernels are readily seen and picked up by the fowls from the ground with little or no waste.

It will be understood that my described device operates both as an economical feeder and also as an exerciser whereas, under the ordinary method of feeding, by scattering the feed directly upon the ground, the fowl simply gorges itself with an unnecessary quantity of food, and thus wastes a large percentage of it.

Having thus described my invention, I claim:—

1. In combination, a cylindrical food receptacle, means for suspending said receptacle so that it may swing freely, the circumferential wall of said receptacle having openings at its lower portion in position to be reached by the fowls, reticulated means partially covering said openings, and a trough located below the said openings, and means for separably connecting the said trough with the receptacle.

2. In combination, a cylindrical food receptacle, means for supporting said receptacle so that it may swing freely, said receptacle having openings, reticulated means partially covering the said openings, a trough located below said openings, and means consisting of a bolt and nut for detachably securing said trough to the receptacle.

WOODBURY O. ROGERS.

Witnesses.
 FRANK H. ALLEN,
 MADELINE D. RITCHIE.